United States Patent [19]

Hirai et al.

[11] Patent Number: 4,598,134

[45] Date of Patent: Jul. 1, 1986

[54] SILICONE PRIMER COMPOSITION

[75] Inventors: Kazuo Hirai, Ichihara; Takao Matsushita, Kisarazu, both of Japan

[73] Assignee: Toray Silicone Company, Ltd., Tokyo, Japan

[21] Appl. No.: 728,989

[22] Filed: Apr. 30, 1985

[30] Foreign Application Priority Data

May 4, 1984 [JP] Japan .................. 59-89952

[51] Int. Cl.$^4$ .................. C08G 77/06
[52] U.S. Cl. .................. 528/17; 528/31; 528/32; 528/43; 156/329
[58] Field of Search .................. 528/17, 32, 43, 31

[56] References Cited

U.S. PATENT DOCUMENTS

| | | | |
|---|---|---|---|
| 4,141,926 | 2/1979 | Ariga et al. | 528/17 |
| 4,332,844 | 6/1982 | Hamada et al. | 427/387 |
| 4,431,472 | 2/1984 | Hohl et al. | 156/307.3 |
| 4,546,018 | 10/1985 | Ryuzo et al. | 528/17 |

*Primary Examiner*—Melvyn I. Marquis
*Attorney, Agent, or Firm*—Edward C. Elliott

[57] ABSTRACT

A primer composition for heat curable silicone rubber compositions has been developed which provides adhesion to various synthetic rubbers, plastics, and inorganic materials. The primer composition is composed of three components. Component (I) consists of component (A) or (B). Component (A) consists of an organosilicon compound containing at least one epoxy group-containing monovalent hydrocarbon group, and at least one silicon-bonded lower alkenyl group or silicon-bonded hydrogen atom in each molecule. Component (B) consists of a mixture of (a) an organosilicon compound which possesses silicon-bonded hydroxyl and silicon-bonded lower alkenyl or silicon-bonded hydrogen, and (b) an organotrialkoxysilane containing at least one epoxy group-containing monovalent hydrogen group. Component (II) comprises a trialkoxysilane or its partial hydrolysis product. Component (III) comprises an organotitanate ester.

11 Claims, No Drawings

SILICONE PRIMER COMPOSITION

BACKGROUND OF THE INVENTION

1. Field of the Invention

The primer of this invention relates to a primer composition appropriate for adhering curable silicone compositions, particularly heat curable, to the surfaces of various organic materials.

2. Background Information

Silicone rubbers have an excellent heat resistance and for this reason have recently been used in a broad range of applications in which rubber elasticity is required at elevated temperatures. However, silicone rubbers are more expensive than general-purpose synthetic rubbers and general-purpose plastics and have slightly inferior properties, i.e., initial mechanical properties, steam resistance and chemical resistance, etc., compared to some synthetic rubbers and plastics. In order to eliminate these drawbacks of high cost and other unsatisfactory properties, composite materials have been widely used up to now in which the surface of a synthetic rubber or plastic is coated with a silicone rubber so the rubber or plastic material will not suffer from oxidative degradation by oxygen at elevated temperatures.

However, these composite materials occasionally exhibit unsatisfactory capabilities because the silicone rubber does not adhere to the surface of the synthetic rubber or plastic. In particular, silicone rubbers exhibit this drawback with regard to polyolefin synthetic rubbers or plastics. Due to this, the appearance of an effective primer composition would be desirable.

In U.S. Pat. No. 4,332,844, issued June 1, 1982, Hamada et al. teach a silicone composition consisting of an organosilicon compound containing at least one silicon-bonded alkoxy radical per molecule, an organotitanate and an organohydrogen-silicon compound as a primer composition.

In U.S. Pat. No. 4,431,472, issued Feb. 14, 1984, Höhl, et al. teach the use of a primer composition containing (a) a mixture of a silane having an SiC-bonded aliphatic multiple bond and a silane having an SiC-bonded epoxy group and applying a crosslinkable organopolysiloxane composition over the primer.

SUMMARY OF THE INVENTION

A primer composition has been developed which can tightly adhere curable silicone compositions and particularly heat-curable silicone rubber compositions to various synthetic rubbers, plastics, and to inorganic materials brought into contact with the silicone compositions during cure. The primer composition is composed of three components. Component (I) consists of component (A) or (B). Component (A) consists of an organosilicon compound containing at least one epoxy group-containing monovalent hydrocarbon group, and at least one silicon-bonded lower alkenyl group or silicon bonded hydrogen atom in each molecule. Component (B) consists of a mixture of (a) an organosilicon compound which possesses silicon-bonded hydroxyl and silicon-bonded lower alkenyl radicals or silicon-bonded hydrogen, and (b) an organotrialkoxysilane containing at least one epoxy group containing monovalent hydrocarbon group. Component (II) comprises a trialkoxysilane or its partial hydrolysis product. Component III comprises an organotitanate ester.

It is an object of this invention to produce a silicone primer composition which will tightly adhere curable silicone compositions, particularly heat-curable silicone rubber compositions to various synthetic rubbers, plastics, and inorganic surfaces.

DESCRIPTION OF THE INVENTION

The present invention relates to a primer composition consisting essentially of Component (I) consisting of either (A) consisting of an organosilicon compound in which at least one A(RO)$_2$Si group and at least one silicon-bonded lower alkenyl group or silicon-bonded hydrogen atom are present in each molecule where A is an epoxy group-containing monovalent hydrocarbon group and R is a lower alkyl group; or (B) consisting of a mixture of (a) an organosilicon compound which contains silicon-bonded hydroxyl group and silicon-bonded lower alkenyl group or silicon-bonded hydrogen atom, and (b) an organotrialkoxysilane with the general formula ASi(OR$^1$)$_3$ where A is as defined above and R$^1$ is an alkyl group; Component II consisting essentially of a trialkoxysilane with the general formula R$^2$Si(OR$^3$)$_3$ or its partial hydrolysis condensation product where R$^2$ is a hydrogen atom or an organic group possessing an aliphatically unsaturated bond and R$^3$ is an alkyl group; and Component (III) consisting essentially of an organotitanate ester.

Component (I) is the principal component of the primer composition of the present invention. It forms a cured film that tightly adheres to the substrate by an alcohol-liberating condensation with component (II) in the presence of ambient moisture and in the presence of catalytically active component (III). Component (I) consists of either component (A) or component (B). Component (A) is an organosilicon compound in which at least one A(RO)$_2$Si group and at least one silicon-bonded lower alkenyl group or silicon-bonded hydrogen atom are present in each molecule. A is an epoxy group-containing monovalent hydrocarbon group and R is a lower alkyl group. Each molecule of component (A) preferably possesses at least 2 epoxy group-containing monovalent hydrocarbon groups with the general formula

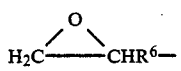

R$^6$ is an arbitrary divalent organic radical for which concrete examples are the phenylene group, hydroxylated hydrocarbon radicals, the chloroethylene group, the fluoroethylene group, —CH$_2$OCH$_2$CH$_2$CH$_2$—, —CH$_2$CH$_2$OCH$_2$CH$_2$—, —CH$_2$CH$_2$OCH(CH$_3$)CH$_2$— and —CH$_2$OCH$_2$CH$_2$OCH$_2$CH$_2$—. Other examples of A are the beta-(3,4-epoxycyclohexyl)ethyl group and the gamma-(3,4-epoxycyclohexyl)propyl group. Concrete examples of R are methyl, ethyl, normal-propyl, isopropyl, hexyl, and methoxyethyl. The methyl group is preferred. Concrete examples of the silicon-bonded lower alkenyl group are allyl, 1-butenyl and isopropenyl. Typical examples of the organosilicon compound include organosilanes and organopolysiloxanes. The molecular configuration of such an organopolysiloxane is straight chain, branched chain, cyclic or network. The degree of polymerization is equal to or greater than 2; however, it is preferably a degree of polymerization corresponding to an oligomer. Concrete examples of component (A) are

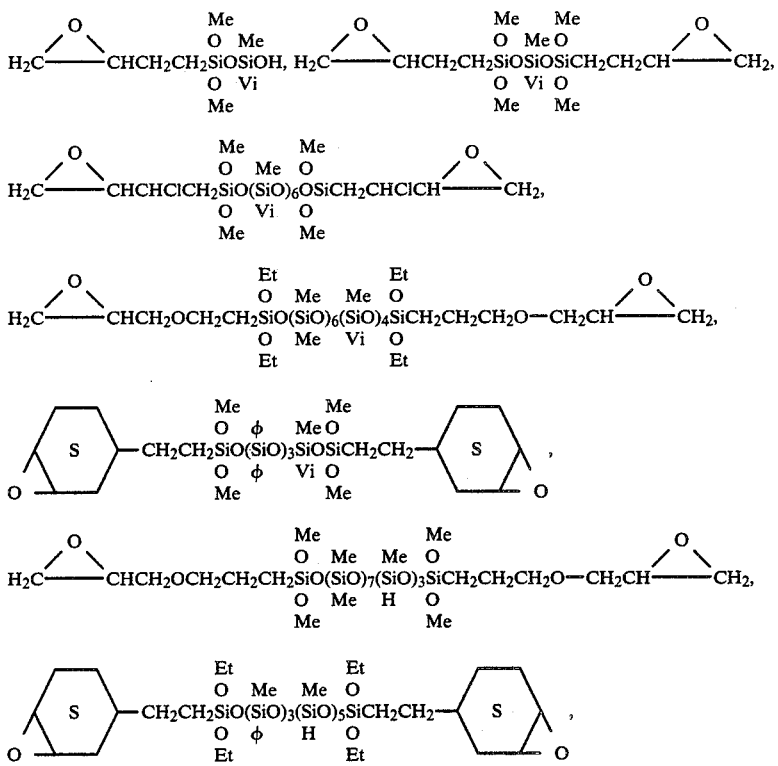

copolymer resins constituted of 52.5 mol % $MeSiO_{1.5}$ units, 5 mol % $ViSiO_{1.5}$ units, 40 mol % $Me\phi SiO$ units and 2.5 mol %

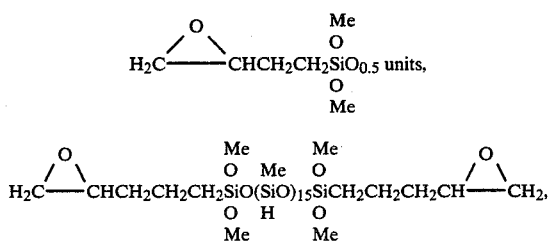

and copolymer resins constituted of 50 mol % $MeSiO_{1.5}$ units, 40 mol % $Me\phi SiO$ units, 4.7 mol % MeHSiO units, 2.3 mol % $Me_3SiO_{0.5}$ units and 3.0 mol %

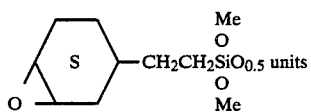

(Me is the methyl group, Et is the ethyl group, Vi is the vinyl group and $\phi$ is the phenyl group). These organosilicon compounds comprising component (A) can be produced by the alcohol-liberating condensation of an organotrialkoxysilane in which, for example, the organic group is the epoxy group-containing monovalent hydrocarbon group, with an organopolysiloxane possessing silicon-bonded hydroxyl groups at elevated temperatures of 150° to 160° C. for several hours.

The component (B) which may constitute component (I) is a mixture of (a) an organosilicon compound which possesses silicon-bonded hydroxyl and silicon-bonded lower alkenyl or silicon-bonded hydrogen and (b) an organotrialkoxysilane with the general formula ASi-(OR$^1$)$_3$ (A carries the preceding definition and R$^1$ is an alkyl group). Among these components, the organosilicon compounds comprising component (a) are typically organosilanes and organopolysiloxanes. The molecular configuration of such an organopolysiloxane is straight chain, branched chain, cyclic or network. The degree of polymerization is equal to or greater than 2; however, it is preferably the degree of polymerization corresponding to an oligomer. At least 1 silicon-bonded hydroxyl group and at least 1 silicon-bonded lower alkenyl group or silicon-bonded hydrogen atom are present in each molecule; however, equal to or greater than 2 of each are preferred from the standpoint of adhesion.

Concrete examples of the organosilicon compounds comprising component (a) are

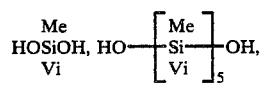

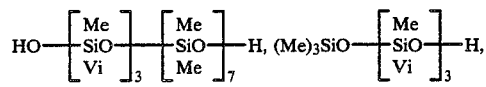

organopolysiloxane resins constituted of 52.5 mol % $MeSiO_{1.5}$ units, 5 mol % $ViSiO_{1.5}$ units, 35 mol % $Me\phi SiO$ units and 5 mol % $HO(Me)_2SiO_{0.5}$ units,

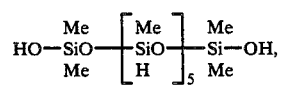

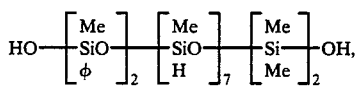

and organopolysiloxane resins constituted of 3 mol % $(Me)_3SiO_{0.5}$ units, 4 mol % $HO(Me)_2SiO_{0.5}$ units, 10 mol % MeHSiO units and 83 mol % $MeSiO_{1.5}$ units. In the above chemical formulas, Me, $\phi$ and Vi carry their definitions from above. Examples of A in the general formula $ASi(OR^1)_3$ for organotrialkoxysilanes comprising component (b) are the same as given for component (A) and examples of the alkyl group $R^1$ are the same as R described for component (A).

The mixing ratio of component (a) with component (b) is arbitrary; however, component (b) is preferably present at 0.5 to 3 mol relative to 1 mol component (a).

Component (II) undergoes an alcohol-liberating condensation with component (I) in the presence of ambient moisture and catalytically active component (III) to form a cured film adhering to the substrate. $R^2$ in general formula $R^2Si(OR^3)_3$ is a hydrogen atom or an organic group possessing an aliphatically unsaturated bond. Concrete examples of the organic group possessing an aliphatically unsaturated bond are alkenyl, acryloxyalkyl and methacryloxyalkyl groups. $R^3$ is an alkyl group. Preferred examples of $R^2Si(OR^3)_3$ are organotrialkoxysilanes with the general formula $H_2C=CH(CH_2)_aSi(OR^3)_3$ (where a is 0 or 1 and $R^3$ carries the preceding definition) and organotrialkoxysilanes with the general formula

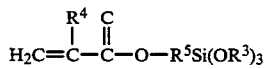

(where $R^4$ is a hydrogen atom or methyl group; $R^5$ is a divalent hydrocarbon group such as an alkylene group, e.g., methylene, ethylene or propylene, or an arylene group such as phenylene and $R^3$ carries the preceding definition). Concrete examples of these trialkoxysilanes are triethoxysilane, vinyltrimethoxysilane, vinyltriethoxysilane, vinyltris(beta-methoxyethoxy)silane, gamma-methacryloxypropyltriethoxysilane, gamma-acryloxypropyltrimethoxysilane, allyltrimethoxysilane and allyltriethoxysilane. The partial hydrolysis products of these trialkoxysilanes may also be employed.

Component (III) is an organotitanate ester with a catalytic activity such that the mixture of components (I) and (II) cures in the presence of ambient moisture and rapidly air-dries. Concrete examples of component (III) are tetra(propyl)titanate, tetra(normal-butyl)titanate, butyl titanate dimer, tetra(2-ethylhexyl)titanate, the polycondensation products of these titanates, and titanium chelate compounds, such as titanium bisacetylacetonate, dibutoxytitanium bisacetylacetonate, titanium lactate ethyl esters and titanium triethanolaminate.

The mixing proportions of components (I) to (III) are arbitrary; however, component (II) is preferably present at 5 to 500 weight parts per 100 weight parts of component (I) while component (III) is present at 1 to 200 weight parts per 100 parts component (I).

The primer composition of the present invention is readily produced by simply mixing the preceding components (I) to (III) with each other to homogeneity. Inorganic additives such as fumed silica, fumed silica whose surface has been hydrophobicized with organosilane, and extremely fine silica powder such as fine quartz powder; thermal stabilizers such as red iron oxide, cerium oxide, cerium hydroxide; aliphatic acid salts of cerium and aliphatic acid salts of iron; pigments such as titanium dioxide and carbon black; and organic solvents such as rubber volatile oil, toluene, xylene, ethanol, and trichloroethane may be optionally added.

The primer composition produced in the present invention may be cured by coating it on the adherend and air-drying for 10 minutes or longer followed by the application and curing of the curable silicone rubber composition or curable silicone resin composition. The primer composition is optionally baked to secure a reliable cure.

The primer composition of the present invention is coated on the surface of an organic material such as a synthetic rubber, e.g., ethylene-propylene rubber, isoprene rubber, chloroprene rubber, Hypalon, butyl rubber, chlorinated butyl rubber, etc., or a plastic, e.g., polyethylene resin, polypropylene resin, polyester resin, acrylic resin, phenol resin, epoxy resin, etc., or is coated on the surface of an inorganic material such as glass, metal or ceramic, etc., and a curable silicone composition and particularly a heat-curable silicone rubber composition or a heat-curable silicone resin composition is applied, and then cured in order to tightly and durably adhere the cured silicone material to the various materials.

The present invention will be explained using demonstrational examples. "Parts" and "%" in the examples denote "weight parts" and "weight%," respectively. In the chemical formulas, Me is the methyl group, Et is the ethyl group, Vi is the vinyl group and $\phi$ is the phenyl group.

EXAMPLE 1

100 parts of an organopolysiloxane with general formula (1)

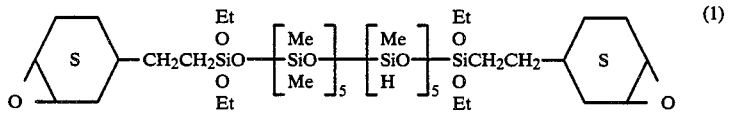

are mixed with 40 parts gamma-methacryloxypropyltriethoxysilane and 50 parts di(normal-butoxy) titanium bisacetylacetonate to homogeneity and then dissolved in normal-hexane to obtain a 15% solution. The resulting primer composition is coated on test pieces (30 mm (width)×100 mm (length)×3 mm (thickness)) of vulcanizates of an ethylene-propylene terpolymer rubber (EPDM) composition and an EPDM-silicone rubber blend rubber composition (SE4306 from Toray Silicone Co., Ltd.) and then air-dried at room temperature for 40 minutes. A silicone rubber composition (SH1135u from Toray Silicone Co., Ltd.) which contains 0.5% 2,3-dimethyl-2,5-di(tertiary-butylperoxy)hexane as the vulcanization agent is adhered in a thickness of 3 mm to the above primer composition and then cured at a temperature of 170° C. under an elevated pressure of 25 kg/cm² for 10 minutes. Test pieces are thus obtained in which the silicone rubber is tightly adhered on the above-mentioned adherend material. The test piece is repeatedly bent at its center 1000 times at an angle of 90°; however, the silicone rubber could not be peeled off from the rubber adherend.

EXAMPLE 2

100 parts of an organopolysiloxane with general formula (2)

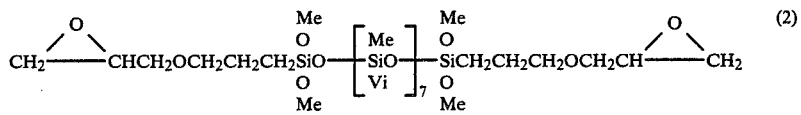

are mixed with 60 parts vinyltrimethoxysilane and 40 parts tetra(normal-butyl)titanate to homogeneity and then dissolved in rubber volatile oil to give a 10% solution (denoted as primer composition P-1 below). A mixture of 72.5 parts organopolysiloxane with general formula (3) and 27.5 parts epoxysilane with general formula (4) is mixed with 60 parts vinyltrimethoxysilane and 40 parts tetrabutyl titanate to homogeneity and then dissolved in rubber volatile oil to give a 10% solution (denoted as primer composition P-2 below).

$$\underset{\text{Vi}}{\text{HO}-(\text{SiO})_{77}-\text{H}} \quad (3)$$
$$\overset{\text{Me}}{}$$

For comparison, primer compositions Q-1 and Q-2 are produced from primer compositions P-1 and P-2, respectively, by omitting the vinyltrimethoxysilane.

The above primer compositions are coated on test pieces (30 mm (width)×100 mm (length)×3 mm (thickness)) of vulcanizates of an ethylene-propylene terpolymer rubber (EPDM) composition, an EPDM-silicone rubber blend rubber composition (SE-4306 from Toray Silicone Co., Ltd.) and a chloroprene rubber composition and on test pieces of a polyethylene resin solid material. The resulting primer compositions are air-dried at room temperature for 60 minutes or baked at 80° C. for 60 minutes. A silicone rubber composition (SH-52u from Toray Silicone Co., Ltd.) containing 0.5% 2,3-dimethyl-2,5-di(tertiary-butylperoxy)hexane is adhered in a thickness of 4 mm on the above primer compositions and then cured at a temperature of 170° C. under an elevated pressure of 25 kg/cm² for 10 minutes. Test pieces are thus produced in which the silicone rubber is tightly adhered to the adherend material.

The silicone rubber layer was subjected to a tensile peeling force at 180° C. from the test sheet in which the silicone rubber was adhered to the adherend sheet. The results are reported in Table 1.

TABLE 1

| | The Present Invention | | | | Comparison Examples | | | |
|---|---|---|---|---|---|---|---|---|
| | Primer Designation | | | | | | | |
| | P-1 | | P-2 | | Q-1 | | Q-2 | |
| Drying Conditions | Air Dry, RT | Baking | Air Dry, RT | Baking | Air Dry, RT | Baking | Air Dry, RT | Baking |
| Primer Dryability | Good | Good | Good | Good | Poor | Poor | Poor | Poor |
| Peel Strength, kg/cm | | | | | | | | |
| Substrate | | | | | | | | |
| EPDM | 4.2 | 4.4 | 4.1 | 4.4 | 2.0 | 2.4 | 1.8 | 2.3 |
| EPDM-silicone Blend Rubber (SE4306) | 4.1 | 4.0 | 4.1 | 4.1 | 1.8 | 2.2 | 1.7 | 2.0 |
| Chloroprene Rubber | 4.3 | 4.3 | 4.2 | 4.4 | 2.1 | 2.2 | 1.9 | 2.2 |
| Polyethylene Resin | 1.9 | — | 2.1 | — | 0.6 | — | 0.6 | — |

RT = Room Temperature

EXAMPLE 3

Primer compositions P-1 and P-2 of Example 2 are coated on test pieces (30 mm (width)×100 mm (length)×3 mm (thickness)) of the vulcanizates of an EPDM rubber composition and of SE4306 and then air-dried at room temperature for 60 minutes. An addition-curable liquid silicone rubber composition (SE6706 from Toray Silicone Co., Ltd.) is adhered in a thickness of 2 mm on the preceding primer coat surfaces and then cured at a temperature of 150° C. under an elevated pressure of 25 kg/cm² for 5 minutes. Test sheets are thus obtained in which the silicone rubber is tightly adhered to the above-mentioned adherend materials. These test sheets are examined by the same adhesion test as in Example 1. The results are 100% cohesive failure in all test sheets.

That which is claimed is:

1. A silicone primer composition consisting essentially of
Component (I) consisting of either
  (A) consisting of an organosilicon compound in which at least one A(RO)₂Si group and at least one silicon-bonded lower alkenyl group or silicon-bonded hydrogen atom are present in each molecule where A is an epoxy group-containing monovalent hydrocarbon group and R is a lower alkyl group; or
  (B) consisting of a mixture of (a) an organosilicon compound which contains silicon-bonded hydroxyl group and silicon-bonded lower alkenyl group or silicon-bonded hydrogen atom, and (b) an organotrialkoxysilane with the general formula $ASi(OR^1)_3$ where A is as defined above and $R^1$ is an alkyl group;

Component (II) consisting essentially of a trialkoxysilane with the general formula $R^2Si(OR^3)_3$ or its partial hydrolysis condensation product where $R^2$ is a hydrogen atom or an organic group possessing an aliphatically unsaturated bond and $R^3$ is an alkyl group; and Component (III) consisting essentially of an organotitanate ester.

2. The primer composition of claim 1 in which component I consists of (A) in which (A) possesses at least 2 epoxy group-containing monovalent hydrocarbon groups A of the formula

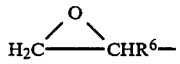

where $R^6$ is a divalent organic radical.

3. The primer composition of claim 1 in which component I consists of (B) in which (a) contains two or more silicon-bonded lower alkenyl groups or hydrogen atoms and at least two silicon-bonded hydroxyl radicals.

4. The primer composition of claim 3 in which there is present from 0.5 to 3 mols of (b) per mol of (a).

5. The primer composition of claim 1 in which component II is an organotrialkoxysilane with the general formula $$H^2C=CH(CH_2)_aSi(OR^3)_3$$

a is 0 or 1 and $R^3$ is as defined above.

6. The primer composition of claim 1 in which component II is an organotrialkoxysilane with the general formula

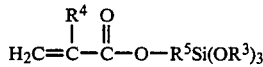

where $R^3$ is as defined above, $R^4$ is a hydrogen atom or methyl group, and $R^5$ is a divalent hydrocarbon group.

7. The primer composition of claim 1 where component II is selected from the group consisting of triethoxysilane, vinyltrimethoxysilane, vinyltriethoxysilane, vinyltris(beta-methoxyethoxy)silane, gamma-methacryloxypropyltriethoxysilane, gamma-acryloxypropyltrimethoxysilane, allyltrimethoxysilane, allyltriethoxysilane, or their partial hydrolysis products.

8. The primer composition of claim 1 in which component III is selected from the group consisting of tetra(propyl)titanate, tetra(normal-butyl)titanate, butyltitanate dimer, tetra(2-ethylhexyl)titanate, a poly condensation product of each of the preceding titanates, titanium bisacetylacetonate, dibutoxytitanium, bisacetylacetonate, titanium lactate ethyl esters, and titanium triethanolaminate.

9. The primer composition of claim 1 in which there is present 100 parts by weight of component (I), from 5 to 500 parts by weight of component (II), and from 1 to 200 parts by weight of component (III).

10. The primer composition of claim 1 in which there is present 100 parts by weight of composition (I) from 10 to 100 parts by weight of component (II), and from 10 to 100 parts by weight of component (III).

11. The primer composition of claim 2 in which 100 parts by weight of component (A), from 10 to 100 parts by weight of component (II) selected from the group consisting of an organotrialkoxysilane of the general formula $$H^2C=CH(CH_2)_aSi(OR^3)_3$$

where a is 0 or 1, and $R^3$ is an alkyl group and an organotrialkoxysilane of the general formula

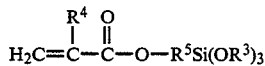

where $R^3$ is as defined above, $R^4$ is a hydrogen atom or methyl group, and $R^5$ is a divalent hydrocarbon group, and from 10 to 100 parts by weight of component (III) are present.

* * * * *